United States Patent
Huang et al.

(10) Patent No.: US 7,881,720 B2
(45) Date of Patent: Feb. 1, 2011

(54) METHOD OF INDOOR RADIO PLANNING

(75) Inventors: Jian Huang, Beijing (CN); Song Song, Beijing (CN); Zhe Xiang, Haidian (CN); Hang Jin Zhang, Goleta, CA (US)

(73) Assignee: International Business Machines Corporation, Armonk, NY (US)

( * ) Notice: Subject to any disclaimer, the term of this patent is extended or adjusted under 35 U.S.C. 154(b) by 1161 days.

(21) Appl. No.: 11/511,961

(22) Filed: Aug. 29, 2006

(65) Prior Publication Data

US 2008/0057873 A1  Mar. 6, 2008

(30) Foreign Application Priority Data

Aug. 29, 2005  (CN) .................... 2005 1 0092374

(51) Int. Cl.
 H04W 40/00 (2009.01)
 H04W 24/00 (2009.01)
(52) U.S. Cl. .................................. 455/446; 455/456.1
(58) Field of Classification Search ............... 455/446, 455/456.1, 296, 450, 63.1; 343/703; 711/206; 370/342, 335
See application file for complete search history.

(56) References Cited

U.S. PATENT DOCUMENTS

| | | | |
|---|---|---|---|
| 5,668,562 A * | 9/1997 | Cutrer et al. ................. | 343/703 |
| 6,208,627 B1 | 3/2001 | Menon | |
| 6,729,929 B1 | 5/2004 | Sayers | |
| 6,978,165 B2 | 12/2005 | Martinez et al. | |
| 7,284,112 B2 * | 10/2007 | Bradford et al. ............ | 711/206 |
| 2003/0021246 A1 | 1/2003 | Ling | |
| 2003/0087641 A1 | 5/2003 | Gustafsson | |
| 2004/0095907 A1 | 5/2004 | Agee | |
| 2004/0162085 A1 * | 8/2004 | Han ........................ | 455/456.1 |
| 2004/0266442 A1 | 12/2004 | Flanagan | |
| 2005/0113107 A1 | 5/2005 | Meunier | |
| 2006/0234640 A1 * | 10/2006 | Hirvonen ................. | 455/67.11 |
| 2007/0054670 A1 * | 3/2007 | Kalika et al. ................ | 455/446 |
| 2007/0105520 A1 * | 5/2007 | Van Houtum ............... | 455/296 |

OTHER PUBLICATIONS

H. Hashemi, "The Indoor Radio Propagation Channel", Proceedings of the IEEE, pp. 943-968, Jul. 1993.

(Continued)

Primary Examiner—Charles N Appiah
Assistant Examiner—Kiet Doan
(74) Attorney, Agent, or Firm—Kenneth R. Corsello; William Stock; Anne Vachon Dougherty

(57) ABSTRACT

A radio planning method and apparatus for determining the setting scheme of base stations in an indoor environment is provided. A radio signal propagation model is generated including a theoretical attenuation part and an environment affecting part. Through on-site measurements, a site radio signal propagation characteristics database is constructed combining the indoor radio signal propagation model and on-site measurement results. Based on the environment-dependent database, a radio signal map representing the radio signal distribution to be generated in the site in the case of placing any type of base station in any position is generated, using the indoor radio signal propagation model. By applying a signal-to-quality mapping, the distribution of a specific quality metric for any base station is obtained. Thus, by inputting different base station parameters, respective radio signal maps can be generated to optimize positioning of base stations.

16 Claims, 5 Drawing Sheets

OTHER PUBLICATIONS

S. Rice, "Mathematical analysis of Random Noise", Bell Systems Technical Journal, 1944.

Y. Chen and H. Kobayashi, "Signal strength based indoor geolocation", IEEE International Conference on Communications, pp. 436-439, Apr. 2002.

Almeroth, et al, "A Hidden Environment Model for Constructing Indoor Radio Maps", IEEE International Symposium on a World of Wireless, Mobile and Multimedia Networks 2005.

International Journal of Wireless Networks, vol. 11, No. 2, Apr. 2004.

"Comparison in MIMO Channels from Multipath Parameter Extraction and Direct Channel Measurements", 0-7803-8523-3/04 IEEE, pp. 1574-1578, Sep. 2004.

Punnoose, et al, "Optimizing Wireless Network Protocols Using Realtime Predictive Propagation Modeling", 0-7803-5454-0/99 IEEE, pp. 39-44, Aug. 1999.

* cited by examiner

METHOD OF INDOOR RADIO PLANNING

FIELD OF THE PRESENT INVENTION

The present invention relates to an indoor radio planning method and apparatus, more particularly, to a radio planning method and apparatus for determining the positioning scheme for base stations in an indoor environment.

DESCRIPTION OF THE RELATED ART

With the development of pervasive wireless communication systems, more and more indoor wireless services and applications, e.g. WLAN (wireless LAN), Bluetooth and Zig-Bee, are emerging in recent years. However, due to the complexity of indoor environments, such as the effect of layouts, building and furniture materials, the radio signal is propagated with an irregular pattern, which greatly affects the QoS (Quality of Service) of wireless communication and applications. Therefore, indoor radio planning becomes an important and interesting problem for indoor wireless services and applications.

Generally, the objective of indoor radio planning is to determine how to place and set radio base stations, so as to meet certain quality requirements. Some typical scenarios are listed as follows.

CDMA/GSM base stations are installed in subway stations to support seamless communications. A signal with certain power has to cover each corner of the subway station to support the communication. But at the same time, the radio power should also be limited to a certain degree due to health and legal considerations. Therefore, it becomes a problem as to how many and which types of base stations are to be selected, and where the base stations should be placed.

WLAN access points are installed in the office for the purpose of communication. Due to security considerations, wireless signals should be limited in a certain area to avoid information leakage and radio interference. Then, problems arise as to where the access points should be placed, how the power of the access points should be adjusted, and how antennas should be selected.

The wireless location service used in museums and supermarket is helpful to guide visitors around the zones. The service utilizes the signal strength of wireless base stations and exploits some location algorithms, such as machine learning or triangular principle, to determine the location. The accuracy of the service relies heavily on the radio signal map of base stations. So, it becomes a problem of how to arrange the setting of base stations to achieve best positioning performance.

Traditionally, indoor radio planning methods fall into two categories: on-site measurement and model-based planning. In the on-site measurement category, the base stations are placed at the selected positions to perform a test. Signals at other positions are measured to obtain the radio distribution. Then, the planning decision is drawn out accordingly. However, the on-site measurement is extremely time-consuming and cumbersome. If one or more base stations is/are moved to another position, the entire measurement procedure must be performed once again. The huge amount of measurement workload makes the on-site measurement unsuitable for radio environment estimation and planning. Furthermore, how to determine the initial positions for base stations is still a problem which is either blind or empirical. The planning decision made by this method is not likely to be optimal, because usually not all possible cases are tested. The methods of the second category, model-based methods, such as Rayleigh fading model, Rician distribution model and Floor Attenuation Factor model, alleviate the measuring burden by calculating the radio signal map mathematically. However, since the radio signal propagation of an indoor environment is dominated by reflections, diffraction and scattering of the radio waves caused by the structures within the building, the prior art indoor propagation models are either insufficiently accurate or are dependent on some model parameters which are hard to acquire. In fact, the most severe problem of these models is that they over-simplify the effect of an indoor environment on signal propagation, resulting in accuracy degradation.

SUMMARY OF THE PRESENT INVENTION

An object of the present invention is to provide a radio planning method and apparatus for determining the setting scheme of base stations in an indoor environment, which can obtain the radio signal map for any type of base station in a site by performing actual on-site measurements for only one type of base station.

According to an aspect of the present invention, there is provided a radio planning method for determining the setting scheme for base stations in an indoor environment, the method includes the steps of: defining at least one transmitting point for placing base station and at least one receiving point for receiving signals transmitted by the base stations; obtaining respective environment affecting factors reflecting the effect of the indoor environment on the radio signal propagated from each of the transmitting points to each of the receiving points, by performing actual measurements with the base stations placed at the transmitting points, wherein one type of base station is placed at one transmitting point; for given one of said at least one transmitting point and various given types of base stations, calculating non-environment-affecting theoretical values of signal strength to be received at each of said at least one receiving points in the case of placing the given type of base station at the given transmitting point, according to a non-environment-affecting theoretical attenuation model corresponding to the given type of base station; and generating a map of signal strength received at each of said at least one receiving point on the basis of said non-environment-affecting theoretical values and said environment affecting factors.

Preferably, the environment affecting factor between the transmitting point and the receiving point is obtained by performing an actual measurement with one type of base station through the steps of: placing said one type of base station at the transmitting point, measuring actually received signal strength at the receiving point, calculating the theoretical value of signal strength received at the receiving point according to the theoretical attenuation model corresponding to said one type of base station, and subtracting the theoretical value from the actually received signal strength to obtain the environment affecting factor. Additionally, environment affecting factors deduced from the obtained environment affecting factors can also be included.

Preferably, the generated radio signal strength map is mapped into a QoS map according to the objective of indoor radio planning. The QoS maps of a plurality of settings of base stations in which at least one type of base stations are placed at said at least one transmitting points are evaluated respectively, and an optimal setting scheme of base stations is selected according to the evaluating results.

According to another aspect of the present invention, there is also provided a radio planning apparatus for determining the setting scheme of base stations in an indoor environment, wherein at least one transmitting point for placing at least one base station and at least one receiving point for receiving signals transmitted by the base stations are defined in said indoor environment, the apparatus including: an environment affecting factor obtaining means for obtaining respective environment affecting factors reflecting the effect of said indoor environment on the radio signal propagated from each of the transmitting points to each of the receiving points, by performing actual measurements with base stations placed at the transmitting points, wherein one type of base station is placed at one transmitting point; a non-environment-affecting theoretical attenuation model calculating means for calculating, for the given one of said at least one transmitting point and various given types of base stations, non-environment-affecting theoretical values of signal strength received at each of said at least one receiving points in the case of placing the given type of base station at the given transmitting point, according to the non-environment-affecting theoretical attenuation model corresponding to the given type of base station; and a received signal strength map generating means for generating a map of signal strength received at each of said at least receiving points on the basis of said non-environment-affecting theoretical values and said environment affecting factors.

The present invention has at least the following advantages:

Accurate radio signal map: The method according to the present invention guarantees the accuracy of a radio signal map by introducing the on-site measurement. Not only the effect of line-of-sight signal attenuation is considered, but also the effects of multiple-path such as reflection, diffraction and scattering are also taken into account, to thereby effectively model the radio signal propagation characteristic in the indoor environment.

High efficiency and reduced workload: The workload for on-site measurement is greatly reduced since the indoor propagation model is introduced. Actually, through the limited on-site measurements, the characteristics of radio signal propagation for the indoor environment are captured. Therefore, the radio signal map can be drawn in a mathematical way, which greatly reduced the on-site measurement workload.

Flexibility: Through the radio planning method and apparatus according to the present invention, it is possible to acquire the radio signal map for an arbitrary setting scheme of base stations without the need for re-measurement. Additionally, the site radio signal propagation characteristics database is independent of the type of base stations or antennas, therefore the radio signal maps of both the omni-directional and the directional antennas can be drawn in a same environment. That is, the radio environment database obtained by performing measurements with one type of base station can be used for all types of base stations.

Feasibility of operations: During the whole planning procedure, only the on-site measurement needs to be conducted manually, and all the other steps can be done by a computer in an automatic manner. So, it is easy to carry out the radio planning method according to the present invention without the need of much knowledge for consumers.

Optimality: It is possible for the radio planning method and apparatus according to the present invention to achieve the optimal or sub-optimal planning results, provided that the computation power is sufficient.

BRIEF DESCRIPTION OF THE DRAWINGS

The above and other objects, features and advantages of the present invention will become more apparent by describing the preferred embodiments of the present invention in detail in conjunction with the attached drawings in which, FIG. 1 schematically shows the process of a radio planning method for determining the setting scheme of base stations in an indoor environment according to the present invention.

DESCRIPTION OF THE PREFERRED EMBODIMENTS

Figure 1:
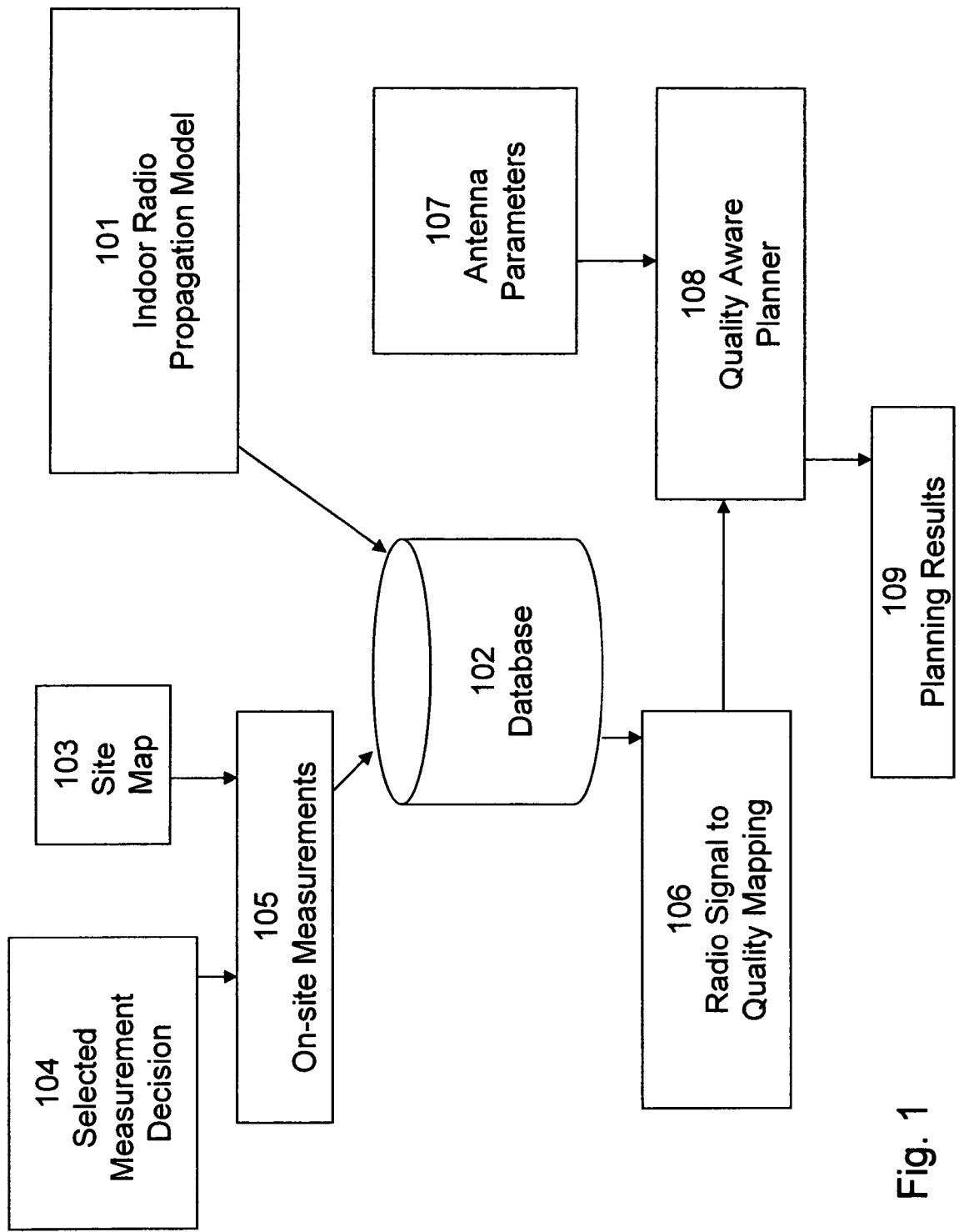

With reference to the figures, the radio planning method and apparatus for determining the setting scheme of base stations in an indoor environment according to the present invention will be described.

When determining the setting scheme of base stations in the indoor environment, the radio signal distributions in a plurality of cases where a plurality of types of base stations are placed in different indoor positions need to be taken into account. However, the actual radio signal maps are related to not only the types and positions of the base stations, but also to the indoor environment.

The inventor of the present invention noticed that, in the case where the position of a base station is given, the radio signal strength distribution in the indoor environment can be divided into two parts, wherein a first part is only related to the types of base stations and is independent of environment affecting, and can be calculated using theoretical model formulas associated with the types of base stations in a mathematical way; whereas a second part is the effect of the indoor environment on the radio signal propagation, which is independent of the types of base stations. In other words, the present invention chooses an indoor radio signal propagation model to depict the rule of propagation attenuation of radio signals in the indoor environment, which is composed of a theoretical attenuation part and an indoor environment affecting part, the theoretical attenuation part representing the characteristics of propagation attenuation of base stations in a vacuum environment, while the indoor environment affecting part represents the additional actual effect of components of the indoor environment, such as walls, furniture and the like, on the radio signal propagation.

Thus, the contribution of the environment affecting part independent of the types of base stations can be obtained by performing actual on-site measurements with respect to one type of base station and excluding the contribution of the theoretical attenuation part associated with the types of base stations from the actual measurement results. After the contribution of the indoor environment affecting part is obtained by performing measurements with one type of base station, the actual radio signal strength can be estimated by utilizing the obtained contribution of the indoor environment affecting part directly for any other type of base station. That is, the indoor environment affecting part obtained with respect to one type of base station is applicable for all types of base stations. Thus, for any type of base station selected by users, it is only necessary to calculate the contribution of the type of base station to the radio signal distribution using theoretical model formulas associated with it, and to simply utilize the originally-obtained environment affecting part independent of the type of base station as the contribution of the indoor environment affecting part of the radio signal distribution, so as to obtain the radio signal distribution in the indoor environment when placing this type of base station in the given position of the base station.

The present invention can utilize various indoor radio signal propagation models, such as the Rayleigh Fading Model (see H. Hashemi, "The Indoor Radio Propagation Channel", *Proceedings of the IEEE*, pages 943-968, July 1993), the Rician Distribution Model (see S. Rice, "Mathematical analysis of Random Noise", *Bell Systems Technical Journal*, 1944), the Floor Attenuation Factor Model (see Y. Chen and H. Kobayashi, "Signal strength based indoor geolocation", *IEEE International Conference on Communications*, Pages 436-439, April 2002), and the Hidden Environment Model (see Zhe Xiang, Hangjin Zhang, Jian Huang, Song Song and Kevin C. Almeroth, "A Hidden Environment Model for Constructing Indoor Radio Maps", submitted to IEEE International Symposium on a World of Wireless, Mobile and Multimedia Networks 2005 (WoWMoM2005)), and so on.

Hereinafter, the Hidden Environment Model will be taken as an example to illustrate the radio planning method and apparatus of the present invention. However, those skilled in the art should understand that other models are applicable to the present invention and can be implemented using similar steps, and thus the descriptions about the other models are not provided in detail here.

First, the Hidden Environment Model to be used in the embodiment of the present invention is described in brief. Assuming the signal strength transmitted by a base station is $P_0$, the theoretical value of signal strength from a transmitting point A received at a receiving point B without considering the environment affecting is $P_{AB}^{th}$, and the actual signal strength from the transmitting point A to be received at the receiving point B in the actual environment is $P_{AB}^{env}$. The relative difference between the theoretical value $P_{AB}^{th}$ and $P_0$ is represented by $P_A(B)$, the relative difference between $P_{AB}^{env}$ and $P_{AB}^{th}$ is represented by Env(A, B), and the relative difference between the actual signal strength $P_{AB}^{env}$ and the signal strength $P_0$ transmitted by the base station is represented by $P_A^{env}(B)$, as defined in the following formulas (1-3), $$P_A(B)[dBm] \equiv k\log(P_{AB}^{th}/P_0) \quad (1)$$

$$Env(A, B)[dBm] \equiv k\log(P_{AB}^{Env}/P_{AB}^{th}) \quad (2)$$

$$P_A^{env}(B)[dBm] \equiv k\log(P_{AB}^{Env}/P_0) \quad (3)$$
$$= k\log(P_{AB}^{th}/P_0) + k\log(P_{AB}^{Env}/P_{AB}^{th})$$
$$= P_A(B)[dBm] + Env(A, B)$$

where k is a constant. Env(A, B) represents the effect of environment on the radio signal propagation between the two points A and B in essence, and can be considered as a constant for given points A and B in a given environment. Formula (3) gives the Hidden Environment Model utilized in the embodiment, wherein the theoretical attenuation part is $P_A(B)$, and the environment affecting part is Env(A, B). In the embodiment, modeling is performed based on the logarithm of the ratio of respective signal strengths. However, those skilled in the art should understand that modeling can be performed in other ways. For example, modeling can be performed directly based on the ratio of respective signal strengths without calculating the logarithm, and at this time, the relation between the theoretical attenuation part and the environment affecting part will be the multiplication relation, instead of the addition relation. Alternatively, in a specific case, it is also possible to represent the relation between the theoretical attenuation part and the environment affecting part by directly performing addition and subtraction operations on the theoretical value $P_{AB}^{th}$ of signal strength and the actual signal strength $P_{AB}^{env}$ (or the ratio between the signal strengths and a reference strength such as the signal strength transmitted by the base station), or in other ways, thereby constructing a model different from that of the embodiment.

In the embodiment, in terms of the theoretical attenuation part, usually, for omni-directional antennas, $P_A(B)$ can be calculated from the following radio theoretical attenuation model formula (4):

$$P_A(B)[dBm]=C-K\log(|AB|) \quad (4)$$

Whereas for directional antennas, $P_A(B)$ can be calculated from the following radio theoretical attenuation model formula (5):

$$P_A(B)[dBm]=C-(K_1+\theta K_2)\log(|AB|) \quad (5)$$

where |AB| represents the distance between the transmitting point A and the receiving point B, θ represents the angle between the main axis of the directional antenna and the connecting line from the transmitting point A to the receiving point B, and C, K, K1, K2 are parameters related to physical specifications of a base station. For example, the specifications of a base station refers to the power magnitude of the antenna of the base station, whether the antenna of the base station is an omni-directional antenna or a directional antenna, the opening direction and opening type of the antenna of the base station when it is a directional antenna, and the like. For a give type of base station, the parameters C, K, K1 and K2 are all constants, and can be obtained from the manufacturer or by experiment. Those skilled in the art should understand that other suitable formulas can be used to model various antennas.

With respect to the environment affecting part Env(A, B), for a given environment, the indoor environment affecting is modeled with an environment matrix, Env(A, A), where A represents a set of points in the indoor environment. For each point pair, (A, B), the environment affecting factor Env(A, B) represents the effect of the surrounding environment on the signal attenuation between point A and point B. Theoretically, in a vacuum environment, the value of each environment affecting factor is zero. Practically, in an open space, the value of each environment affecting factor is also considered as zero. But for indoor environment, these factors are no longer zero, and need to be obtained by on-site measurements and mathematical deduction, which will be described hereinafter.

FIG. 1 schematically shows the process of radio planning method for determining the setting scheme of base stations in an indoor environment according to the present invention. As shown in FIG. 1, an indoor radio signal propagation model 101 is first constructed, and the measurement decision 104 is selectively made for the map 103 of a site that needs the radio planning. The site radio signal propagation characteristics database 102 which describes the radio signal propagation characteristics of a given site is constructed, by combining the indoor radio signal propagation model and selected on-site measurements 105. Based on this environment-dependent database, the radio signal map 106 in the site for any type of base station at any position can be generated in a mathematical way. Preferably, the distribution of specific quality metric for any base station can be obtained by using the signal-to-quality mapping. Thus, with different parameters of base stations 107 inputted, a quality-aware planner 108 can carry out calculation for different types of base stations, thereby selecting the optimal setting scheme of base stations as the planning result 109 according to certain design requirements.

Figure 2:
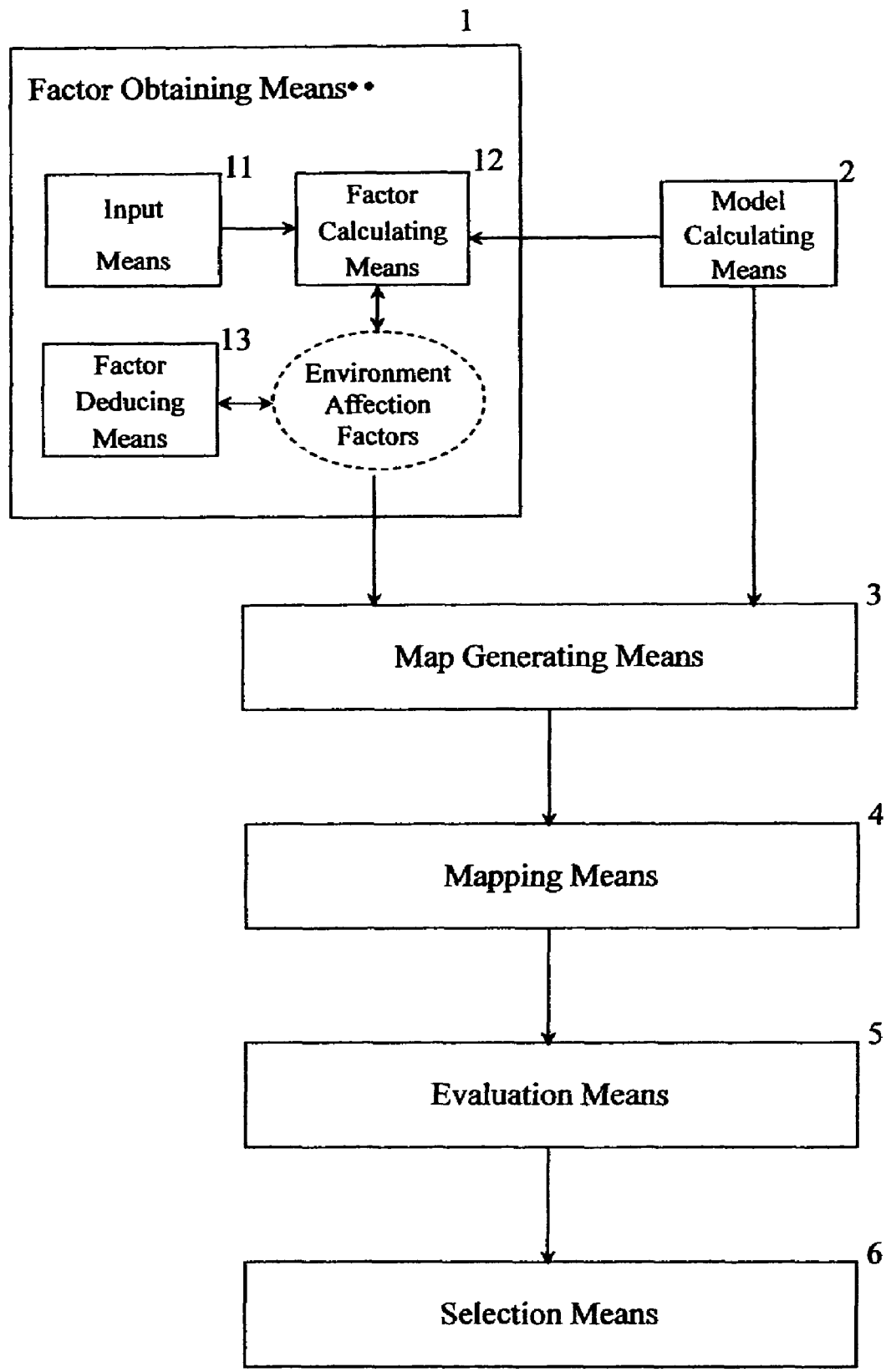
FIG. 2 shows the radio planning apparatus for determining the setting scheme of base stations in an indoor environment according to the present invention.
Figure 3:
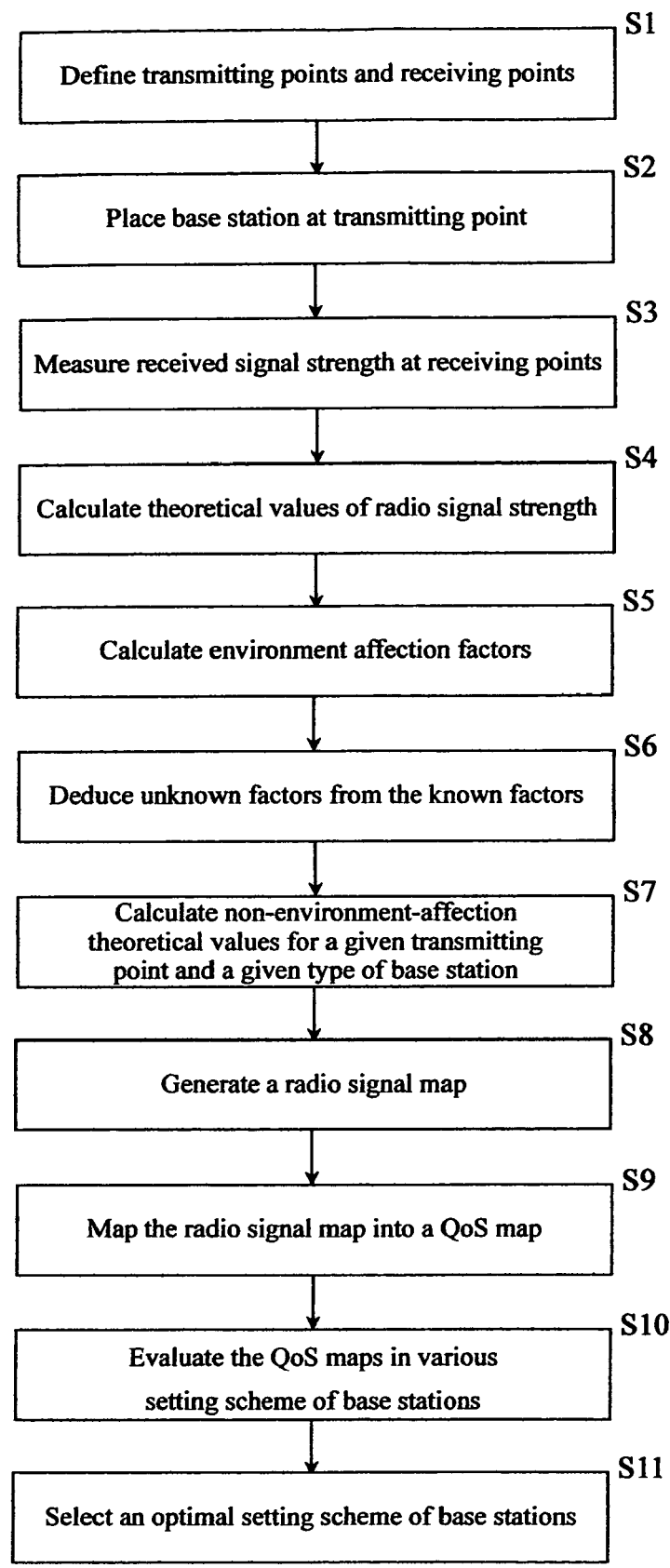
FIG. 3 shows the flow chart of the radio planning method for determining the setting scheme of base stations in the indoor environment according to the present invention.

Hereinafter, the present invention is described in detail with reference to FIGS. 2 and 3. FIG. 2 shows a radio planning apparatus for determining the setting scheme of base stations in an indoor environment according to the present invention, and FIG. 3 shows a flowchart of a radio planning method for determining the setting scheme of base stations in an indoor environment according to the present invention.

As shown in FIG. 2, the radio planning apparatus according to the present invention comprises a factor obtaining means (environment affecting factor obtaining means) 1, a model calculating means (non-environment-affecting theoretical attenuation model calculating means) 2, a map generating means (received signal strength map generating means) 3, a mapping means, an evaluation means 5, and a selection means 6. The factor obtaining means 1 includes an input means (signal strength input means) 11, a factor calculating means (environment affecting factor calculating means) 12, and a factor deducing means (environment affecting factor deducing means) 113.

It is described below how the radio planning apparatus shown in FIG. 2 operates, in conjunction with FIG. 3. First, some transmitting points at which base stations can be placed and some receiving points at which receiving devices for receiving signals transmitted by the base stations can be placed should be selected for the indoor environment, as shown in step S1. In fact, as is well known in the art, the site can be divided into a plurality of cells, and all points in each of the cells are similarly equivalent to one point. Thus, multiple points are determined in the indoor environment, and each of the points can act as the transmitting point and the receiving point respectively in different occasions. In other words, either or both of a base station and a receiving device can be placed on each of the points.

Then, as the preparation work, the factor obtaining means 1 begins to obtain the environment affecting factors which are described hereinbefore, in combination with the model calculating means 2.

In step S2, base stations are placed on several transmitting points on site, where only one base station needs to be placed on one transmitting point, such that only one type of base station needs to be measured for one transmitting point. The base stations placed on different transmitting points can be either of the same type or of different types. Since the base stations placed on different transmitting points can be made to transmit radio signals of different frequencies, the measurements on different base stations do not influence each other, and the base station on each of the transmitting points is measured individually. Of course, the measurement can be performed using one base station by placing it at different transmitting points.

In step S3, the radio signals transmitted by the base stations placed on the above transmitting points are received at several receiving points on site, and the signal strength $P_{AB}^{env}$ of the received radio signals are inputted to the radio planning apparatus of the present invention through the input means 11.

In step S4, according to the theoretical attenuation model corresponding to the type of base station placed on each of the transmitting points, the theoretical value $P_{AB}^{th}$ of strength of the radio signal which is transmitted by the base station at the transmitting point and received at each of the receiving points is calculated by the model calculating means 2.

In step S5, the factor calculating means 12 subtracts the theoretical value $P_{AB}^{th}$ calculated by the model calculating means 2 from the actually received signal strength $P_{AB}^{env}$ inputted by the input means 11, so as to obtain the environment affecting factor Env(A, B) reflecting the effect of the indoor environment on the radio signal propagation between the corresponding transmitting point and receiving point.

Certainly, the environment affecting factors between respective points in the present invention can all be obtained by on-site measurements. However, it is a burdensome work to perform the measurement on every point. Therefore, some optimizing algorithms are preferably adopted to reduce the number of actual measurements. That is, based on the environment affecting factors obtained by actual on-site measurements, the factor deducing means 13 obtains other environment affecting factors by mathematical deductions, as shown in step S6.

The factor deducing means 13 can deduce the unknown environment affecting factors in many ways. Additionally, the matrix constituted by the environment affecting factors can be considered to be obliquely symmetrical, that is, an environment factor with a first point being the transmitting point and a second point being the receiving point is the same as that with the second point being the transmitting point and the first point being the receiving point, which can be commonly referred to as the environment affecting factors between the two points. Thus, the workload of actual on-site measurements can also be reduced.

Generally speaking, the more actual measurements are performed, the more accurate the environment affecting factors are, but necessarily the workload increases. It can be seen that to balance the measurement workload and the accuracy of the environment affecting factors is a tradeoff. In order to minimize the measurement workload while guaranteeing the accuracy of the environment affecting factors, it is needed to determine how many and which environment affecting factors should be measured.

In the paper "A Hidden Environment Model for Constructing Indoor Radio Maps", submitted to the IEEE International Symposium on a World of Wireless, Mobile and Multimedia Networks 2005(WoWMoM2005) by Zhe Xiang, Hangjin Zhang, Song Song and Kevin C. Almeroth, the authors describe how to deduce other environment affecting factors from partial measurement results, and introduce a lazy sampling algorithm to decide how to measure environment affecting factors, which will be described below. However, the manner of deducing the environment affecting factors is not limited to the algorithm described in the paper, and also, the solution to the tradeoff problem between the measurement workload and the accuracy is not limited to the above specific algorithm. For different cases, different deducing manners for the environment affecting factors can be adopted; and according to different optimization criteria, any other measurement scheme optimizing method can be used.

Firstly, it is described below in brief how to deduce the environment affecting factors.

As described above, parts of the environment affecting factors are obtained by calculating the discrepancy between on-site measurement results and purely theoretical values without considering the environment. And, the factor deducing means 13 deduces other environment affecting factors based on the assumption that the environment affecting factors comply with certain local continuity. A deducing method that can be used by the present invention is described below with reference to FIGS. 4A-4C. Taking three points $P_j$, $P_i$ and $P_k$ as an example, assume that the environment affecting factor e(i, j) between $P_i$ and $P_j$ and the environment affecting factor e(i, k) between $P_i$ and $P_k$ have been obtained by measurements, and the environment affecting factor e(j, k) between $P_j$ and $P_k$ needs to be calculated.

Figure 4A:
FIG. 4A to 4C illustrate three cases considered when deducing environment effect factors according to an embodiment of the present invention.

When the three points $P_j$, $P_i$ and $P_k$ are on the same straight line and the two point $P_j$ and $P_k$ are on two sides of $P_i$, as shown in FIG. 4A, e(j, k) is deduced by the following formula (6):

$$e(j,k)=e(i,j)+e(i,k) \quad (6)$$

Figure 4B:

When the three points $P_j$, $P_i$ and $P_k$ are on the same straight line and the two point $P_j$ and $P_k$ are on the same side of $P_i$, as shown in FIG. 4B, e(j, k) is deduced by the following formula (7):

$$e(j,k)=e(i,k)-e(i,j) \quad (7)$$

Figure 4C:
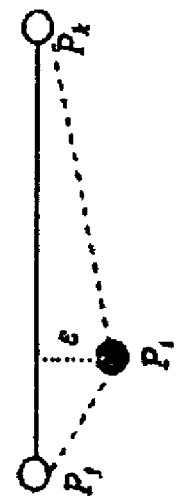

And, when the three points $P_j$, $P_i$ and $P_k$ are not on a same straight line, but the deviation |e| is smaller than or equal to a given threshold, the three points can be considered to be on the same straight line, for example, as shown in FIG. 4C, the two points $P_j$ and $P_k$ are on two sides of $P_i$, and e(i, k) is still deduced using the above formula (6).

In actual operation, it is first decided that how to perform the measurements, i.e. which environment affecting factors should be measured. Then, base stations are placed on site practically, and signals are measured at particular points to obtain corresponding environment affecting factors. The lazy sampling algorithm mentioned above is described below.

As shown above, all of the environment affecting factors can be deduced through some on-site measurement results. The environment affecting factors which can be obtained directly or deduced indirectly with some on-site measurements may be referred to as the environment affecting factors that can be covered by these on-site measurements. Then, some certain measurements can cover some certain environment affecting factors, e(i, j). To calculate all of the environment affecting factors, it is necessary to select the environment affecting factors that need to be measured on site properly so that these on-site measurements can cover all of the environment affecting factors.

In the first step, let a collection S represent all of the environment affecting factors, and let the collection R of the on-site measurements that needs to be performed be empty. In the second step, find the measurement P that can cover the most environment affecting factors in the collection S by combining with the environment affecting factors in the collection R. Put the measurement P into the collection R, and then remove the environment affecting factors that can be covered by the existing measurements in the collection R from the collection S. If the collection S is not empty, the process returns to the second step, and repeats the above operations of finding, adding and removing, until the collection S is empty. At this time, the collection R gives the on-site measurement selections that can cover all of the environment affecting factors.

Based on this, the selected on-site measurements are performed according to the aforesaid steps, and deduction is performed to obtain all of the environment affecting factors.

The obtained environment affecting factors are stored in the site radio signal propagation characteristics database in the form of matrix. The kernel of the database is the environment matrix, Env(A, A), composed of the environment affecting factors, which actually represents the effect of the indoor environment on the radio signal propagation between every two points therein. After constructing the environment matrix, Env(A, A), the work of radio planning preparation phase according to the present invention is completed, and then the radio signal map of arbitrary setting scheme of base station(s) in the indoor environment can be obtained by mathematical calculation. That is, after obtaining the environment matrix, Env(A, A), corresponding radio signal maps can be formed based on the assumption of placing any type of base station at any one of the transmitting points, so as to select the optimal scheme among various setting scheme according to the requirements.

In step S7, for each given transmitting point and various given types of base station, the model calculating means 2 calculates non-environment-affecting theoretical values of signal strength received at each of the receiving points when placing a given type of base station at a given transmitting point, according to the non-environment-affecting theoretical attenuation model corresponding to the given type of base station.

In step S8, the map generating means 3 generates maps of signal strength received at respective receiving points in the case of placing the given type of base station on the given transmitting point on the basis of the non-environment-affecting theoretical value and the environment affecting factors.

Figure 5A:
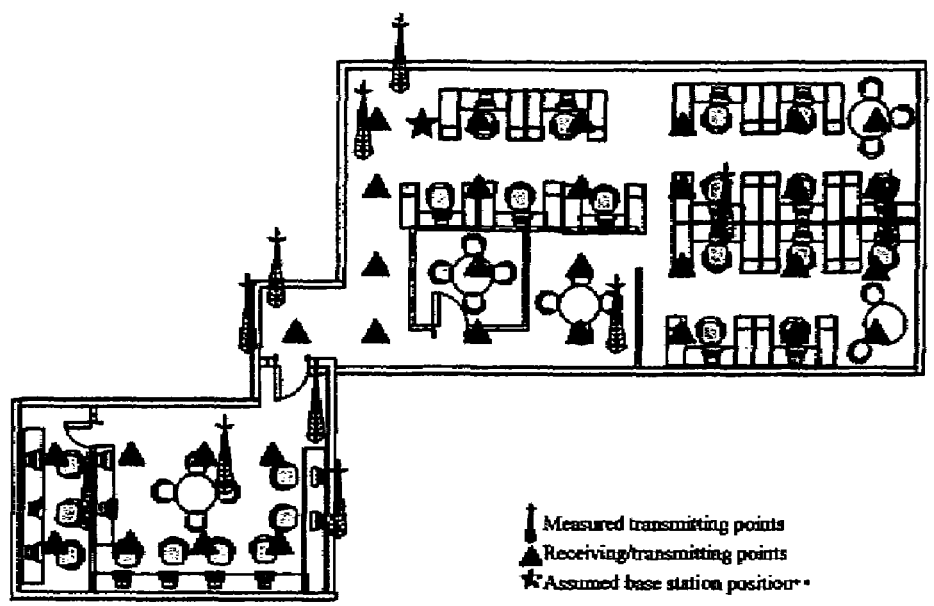
FIG. 5A to 5C show, by way of example, two radio signal maps generated according to the site radio signal propagation characteristics database, for two types of antennas in a same environment.
Figure 5B:
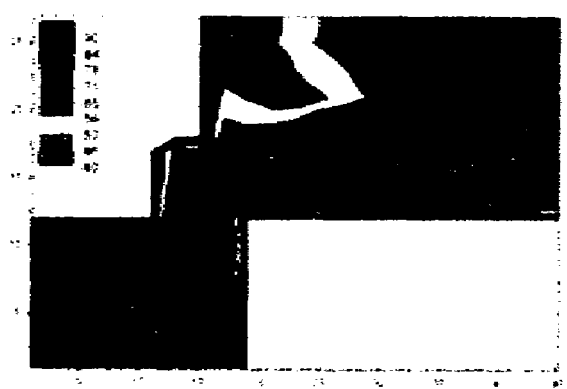
Figure 5C:

By way of example, FIGS. 5A-5C show two radio signal maps generated according to the site radio signal propagation characteristics database for two types of antennas in a same environment. FIG. 5A shows an on-site layout map, wherein the triangular icons represent the preset receiving points and transmitting points, the antenna icons represent the positions of base stations that are actually placed in on-site measurements, and the pentacle icon represents the position (point A) at which a base station is assumed to be placed after the environment matrix E(A, A) is obtained.

FIG. 5B is a radio signal map generated with respect to a setting scheme in which a base station with an omni-directional antenna is placed at point A, while FIG. 5C is a radio signal map generated with respect to a setting scheme in which a base station with a directional antenna is placed at point A and the antenna faces right. In the figures, different signal strengths are shown in different gradations, of course, the different signal strength can also be represented with different colors. In FIG. 5A, a plurality of transmitting points and receiving points are placed discretely, and the continuous maps shown in FIGS. 5B and 5C can be obtained from the signal strengths on the discrete points by common known means, such as differentiation, interpolation and the like.

Since corresponding radio signal maps can be generated in a mathematical way for the case of placing arbitrary base station on arbitrary transmitting point, radio planning can also be achieved in an easy and automatic way. That is, as described above, after the environment matrix is obtained, the radio signal maps under various desired base station setting situations can be generated without on-site measurements. Therefore, the radio signal distributions of various setting schemes of base stations can be evaluated to select the optimal setting scheme of base stations.

For different applications, the objective of radio planning is also different, and thus the evaluation of QoS is different. Accordingly, in step S9, for different applications, the mapping means 4 can perform mapping from radio signals to QoS in respective ways, according to the indoor radio planning objective, so as to convert the generated radio signal maps into specific QoS maps. Here, the word "quality" refers to not only the radio signal quality, but also to performance metrics in other specific applications. For example, when building a radio-based positioning system, the QoS refers to the positioning accuracy. Then, the radio signal strength is mapped into signal vector differentiation reflecting the positioning accuracy. For another example, when building a radio-based identification system, the QoS refers to the accuracy and response time of the identification system.

After mapping the radio signal maps into QoS maps, in step S10, the evaluation means 5 evaluates QoS maps in a plurality of setting schemes of base stations in which at least one type of base station is placed on at least one transmitting point in step S9, respectively. Then, in step S1, the optimal setting scheme of base stations is selected by the selection means 6 according to the evaluation results.

As described above, in the case of placing a given selected base station/antenna at a given point, the application-specific QoS maps can be obtained with mathematical methods. In this case, some mathematical techniques may also be selected to perform the radio planning. This procedure can be called quality aware planning. The following description is made by taking radio planning in a location service system as an example.

In a location service system, the base stations should be placed in a way such that for each geometrical point, the received signals form a distinct signal-strength-vector which clearly differs from other signal-strength-vectors. Therefore, a simulation tool may be used to construct a quality-aware planner for the location service. By applying the site radio environment database, the performance of each radio setting scheme of radio base stations can be evaluated in the simulation tool. Fed with different inputs about the setting scheme of radio base stations (such as the power level, location, the orientation of a directional-antenna, etc), the simulation tool will output different evaluating scores. Typical hill-claiming algorithms or other algorithms can be used in this simulation tool to optimize the setting scheme. As a result, the optimized setting scheme of base stations is calculated to help decide how to deploy the base stations, how to arrange antenna orientation, and how to adjust the power of each base station.

The radio planning method and apparatus according to the present invention separate the theoretical attenuation part from the environment affecting part in the actual radio signal propagation characteristics, whereby the environment affecting factors which are only related to the environment affecting can be obtained by the measurement for one type of base station. Using the obtained environment affecting factors independent of the type of base station, radio signal maps can be generated for any type of base station. Thus, the need of performing a measurement on each type of base station at a same transmitting point is removed, thereby reducing the actual on-site measurement workload.

With the environment affecting factor deducing process, the need for performing measurements on all transmitting points and all receiving points is further removed, thereby further reducing the on-site measurement workload.

By signal-to-quality mapping, the specialized radio signal map is changed into a QoS map, which is helpful for common users to easily realize the QoS. Additionally, the procedures of evaluation and selection can also be accomplished by the system automatically.

Although the present invention is particularly shown and described with reference to the preferred embodiment thereof, those of ordinary skill should understand that various modifications can be made in form and detail therein without departing from the spirit and scope of the present invention as defined by the attached claims.

What is claimed is:

1. A radio planning method for determining optimal positioning of base stations in an indoor environment, comprising the steps of:
    defining a plurality of transmitting points for placing at least one base station and at least one receiving point for receiving signals transmitted by the at least one base station;
    obtaining environment affecting factors indicative of the effect of the indoor environment on the radio signal propagated from each transmitting point to each receiving point by performing actual measurements with a plurality of base stations placed at said plurality of transmitting points and wherein a selected type of base station is placed at one transmitting point;
    for a given one of said transmitting points and at least one type of base station, calculating non-environment-affecting theoretical values of signal strength to be received at each receiving point according to a non-environment-affecting theoretical attenuation model corresponding to the type of base station; and
    generating a map of signal strength received at each of said at least one receiving point on the basis of said non-environment-affecting theoretical values and said environment affecting factors.

2. The method according to claim 1, wherein said step of obtaining said environment affecting factor between a transmitting point and a receiving point by performing actual measurements comprises the steps of:
    placing a selected type of base station at said transmitting point;
    measuring received signal strength at said receiving point;
    calculating the theoretical value of signal strength received at said receiving point according to the theoretical attenuation model corresponding to said selected type of base station; and
    subtracting said theoretical value from said received signal strength to obtain said environment affecting factor.

3. The method according to claim 1, wherein in addition to said environment affecting factors obtained by said actual measurements, additional unknown environment affecting factors are deduced from the obtained environment affecting factors.

4. The method according to claim 3, further comprising the step of selecting environment affecting factors to be obtained by actual measurements using a lazy sampling algorithm.

5. The method according to claim 1, further comprising the step of:
    mapping the generated radio signal strength maps into QoS (Quality of Service) maps.

6. The method according to claim 5, wherein a QoS objective of the indoor radio planning is at least one of positioning accuracy and accuracy and response time of an identification system and wherein said mapping comprises generating said QoS maps according to said QoS objective.

7. The method according to claim 5, further comprising the steps of:
    evaluating the QoS maps of a plurality of setting schemes of base stations in which at least one selected type of base station is placed at said at least one transmitting point; and
    selecting an optimal setting scheme of base stations according to the evaluating results.

8. The method according to claim 1, wherein said theoretical attenuation model is related to the physical specifications of base stations, said physical specifications of base stations including at least one of the power magnitude of the base station antenna and the opening direction and opening type of the base station antenna when the antenna is a directional antenna.

9. The method according claim 8, wherein a first theoretical attenuation model formula for the theoretical attenuation model corresponding to an omni-directional antenna is:

$$P_A(B)[dBm]=C-K\log(|AB|)$$

and a second theoretical attenuation model formula corresponding to a directional antenna is:

$$P_A(B)[dBm]=C-(K_1+\theta K_2)\log(|AB|)$$

where A represents the transmitting point, B represents the receiving point, $P_A(B)$ represents the strength of the radio signal from the transmitting point A received at the receiving point B, |AB| represents distance between the transmitting point A and the receiving point B, $\theta$ represents an angle between the main axis of the directional antenna and the connecting line from the transmitting point A to the receiving point B, and C, K, K1, K2 are parameters related to physical specifications of the base station.

10. A radio planning apparatus for determining optimal positioning of base stations in an indoor environment, wherein at least one transmitting point for placing base station and at least one receiving point for receiving signals transmitted by the base stations are defined in said indoor environment, the apparatus comprising:

an environment affecting factor obtaining means for obtaining environment affecting factors indicative of the effect of the indoor environment on the radio signal propagated from each transmitting point to each receiving point by performing actual measurements with a plurality of base stations placed at transmitting points and wherein a selected type of base station is placed at one transmitting point;

an non-environment-affecting theoretical attenuation model calculating means for calculating at least one non-environment-affecting theoretical value of signal strength to be received at each receiving point according to a non-environment-affecting theoretical attenuation model corresponding to the type of base station; and a received signal strength map generating means for generating a map of signal strength received at each of said at least one receiving point on the basis of said non-environment-affecting theoretical values and said environment affecting factors.

11. The apparatus according to claim 10, wherein the environment affecting obtaining means comprising:

a signal strength input means for inputting the received signal strengths obtained by performing actual measurements at the at least one receiving point; and an environment affecting factor calculating means for subtracting the at least one non-environment-affecting theoretical value calculated by said non-environment-affecting theoretical attenuation model calculating means for said type of base station, the transmitting point and the receiving point, from the received signal strength obtained by actual measurement, to obtain said environment affecting factor between the transmitting point and the receiving point.

12. The apparatus according to claim 10, further comprising:

an environment factor deducing means for deducing additional unknown environment affecting factors from the obtained environment affecting factors.

13. The apparatus according to claim 10, further comprising:

a mapping means for mapping the generated radio signal strength maps into QoS (Quality of Service) maps.

14. The apparatus according to claim 13, further comprising:

an evaluation means for evaluating the QoS maps of a plurality of setting schemes of base stations in which at least one type of base station is placed at said at least one transmitting point, and a selection means for selecting an optimal setting scheme of base stations according to the evaluating results.

15. The apparatus according to claim 10, wherein said theoretical attenuation model is related to physical specifications of base stations, said physical specifications of base stations including at least one of the power magnitude of the base station antenna and an opening direction and opening type of the base station antenna when the antenna is a directional antenna.

16. The apparatus according claim 15, wherein a theoretical attenuation model formula corresponding to an omni-directional antenna is:

$$P_A(B)[dBm]=C-K\log(|AB|)$$

and a theoretical attenuation model formula corresponding to a directional antenna is:

$$P_A(B)[dBm]=C-(K_1+\theta K_2)\log(|AB|)$$

where A represents the transmitting point, B represents the receiving point, $P_A(B)$ represents the strength of the radio signal from the transmitting point A received at the receiving point B, |AB| represents the distance between the transmitting point A and the receiving point B, $\theta$ represents the angle between the main axis of the directional antenna and the connecting line from the transmitting point A to the receiving point B, and C, K, K1, K2 are parameters related to physical specifications of the base station.

* * * * *